US012261691B2

(12) United States Patent
Leconte et al.

(10) Patent No.: US 12,261,691 B2
(45) Date of Patent: Mar. 25, 2025

(54) END-TO-END TRANSACTION INTEGRITY THROUGH STANDARD INTERCONNECT

(71) Applicant: NXP B.V., Eindhoven (NL)

(72) Inventors: Loic Leconte, Vence (FR); Mark Norman Fullerton, Austin, TX (US); Mathieu Blazy-Winning, Pibrac (FR)

(73) Assignee: NXP B.V., Eindhoven (NL)

( * ) Notice: Subject to any disclaimer, the term of this patent is extended or adjusted under 35 U.S.C. 154(b) by 106 days.

(21) Appl. No.: 18/317,494

(22) Filed: May 15, 2023

(65) Prior Publication Data

US 2024/0070018 A1   Feb. 29, 2024

(30) Foreign Application Priority Data

Aug. 31, 2022 (EP) ..................... 22306293

(51) Int. Cl.
*H04L 1/00* (2006.01)
*G06F 11/10* (2006.01)
*G06F 13/40* (2006.01)
*G06F 15/78* (2006.01)

(52) U.S. Cl.
CPC .......... *H04L 1/004* (2013.01); *G06F 11/1048* (2013.01); *G06F 13/4004* (2013.01); *G06F 15/7825* (2013.01)

(58) Field of Classification Search
CPC ............. G06F 11/1048; G06F 13/4004; G06F 15/7825; G06F 11/08; G06F 21/606; G06F 21/64; G06F 11/1004; H04L 63/123; H04L 1/004; H04L 9/40
See application file for complete search history.

(56) References Cited

U.S. PATENT DOCUMENTS 7,562,284 B2    7/2009  Benhase et al.
8,560,932 B2 *  10/2013 Kleihorst ........... G01R 31/3193
                                                714/736

(Continued)

OTHER PUBLICATIONS

Rambo, E.A. et al., "Providing Integrity in Real-Time Networks-on-Chip, " in€IEEE Transactions on Very Large Scale Integration (VLSI) Systems, vol. 27, No. 8, pp. 1907-1920, Aug. 2019.

*Primary Examiner* — Steve N Nguyen

(57) ABSTRACT

A system-on-chip (SoC) method and apparatus are disclosed for checking end-to-end integrity of communications over an network interconnect, where the SoC includes an initiator subsystem connected over the network interconnect to a target subsystem, wherein a first integrity module is configured to compute a first integrity value based on regular transaction messages sent or received by the initiator subsystem and to send a protecting information transaction (PIT) message over the network interconnect to the target subsystem, wherein a second integrity module is configured to compute a second integrity value based on regular transaction messages sent or received by the destination subsystem and to send a PIT response message over the network interconnect to the initiator subsystem, and wherein a compatibility module compares the first and second integrity values to verify the end-to-end integrity of the regular transaction messages sent or received over the network interconnect.

19 Claims, 7 Drawing Sheets

(56) References Cited

U.S. PATENT DOCUMENTS

| | | | |
|---|---|---|---|
| 2002/0091976 A1* | 7/2002 | Lee | H04L 1/14 714/800 |
| 2002/0144209 A1* | 10/2002 | Ariel | H03M 13/35 714/792 |
| 2003/0021240 A1* | 1/2003 | Moon | H04B 7/2631 370/320 |
| 2003/0066011 A1* | 4/2003 | Oren | H03M 13/093 |
| 2006/0069980 A1* | 3/2006 | Tzannes | H04L 1/22 714/781 |
| 2009/0210770 A1* | 8/2009 | DeCusatis | H04L 1/004 714/776 |
| 2020/0328879 A1 | 10/2020 | Makaram et al. | |
| 2021/0089388 A1 | 3/2021 | Makaram et al. | |
| 2021/0336767 A1 | 10/2021 | Makaram et al. | |
| 2021/0397379 A1 | 12/2021 | Leconte et al. | |
| 2021/0397739 A1 | 12/2021 | Tanaka | |

\* cited by examiner

END-TO-END TRANSACTION INTEGRITY THROUGH STANDARD INTERCONNECT

CROSS-REFERENCE TO RELATED APPLICATIONS

This application claims priority under 35 U.S.C. § 119 to European patent application no. 22306293.6, filed Aug. 31, 2022, the contents of which are incorporated by reference herein.

BACKGROUND OF THE INVENTION

Field of the Invention

The present invention is directed in general to the field of information handling systems. In one aspect, the present invention relates to providing data transaction integrity checking and recovery in a standard interconnect used with information handling systems.

Description of the Related Art

Information handling systems are computer-based instrumentalities primarily designed to compute, classify, process, transmit, receive, retrieve, originate, switch, store, display, manifest, measure, detect, record, reproduce, handle, or utilize any form of information, intelligence or data for business, scientific, control, or other purposes. Increasingly in automotive market applications, information handling systems are implemented in integrated circuit form with any suitable configuration of one or more microprocessors or microcontrollers, but different integrated circuit configurations provide different challenges for implementing required information handling system functionality. For example, a multiprocessor system on a chip (SoC) is a single integrated circuit die, substrate, or microchip that includes a plurality of CPU processors or cores that communicate over an interconnect network or bus with a combination with additional components of a computer or other electronic system on a single integrated circuit die, substrate, or microchip. Due to the increasing threat of random hardware faults, efficiently achieving high reliability and dependability requires end-to-end transaction integrity and predictability for on-chip SoC communications. These data integrity challenges are amplified with SoC-based information handling systems which do not only rely on local embedded tightly coupled memories (TCMs), but instead execute code from external DRAM which presents a challenge with ensuring the integrity of the code/data exchanged with the CPU processor(s)/core(s). While DRAM controllers often include in-line error correction coding (ECC) features to protect data integrity in the DRAM, the communication link between the CPU processor(s)/core(s) and DRAM controller remains susceptible to data errors or faults.

To eliminate, control, or contain the impact of data faults, network-on-chip (NoC) interconnects have been developed to which include data integrity protection features that achieve end-to-end protection for the targeted ASIL level, but such solutions are complex and expensive to implement. Other solutions have been developed to build a lock-step NoC interconnect with logic that detects discrepancies in the way transactions are propagating through the NoC. However, this approach is also area-expensive as it basically doubles the area of the NoC.

As seen from the foregoing, existing solutions for operating and controlling SoC-based information handling systems are extremely difficult at a practical level by virtue of the challenges with providing end-to-end data integrity protection. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Figure 1:
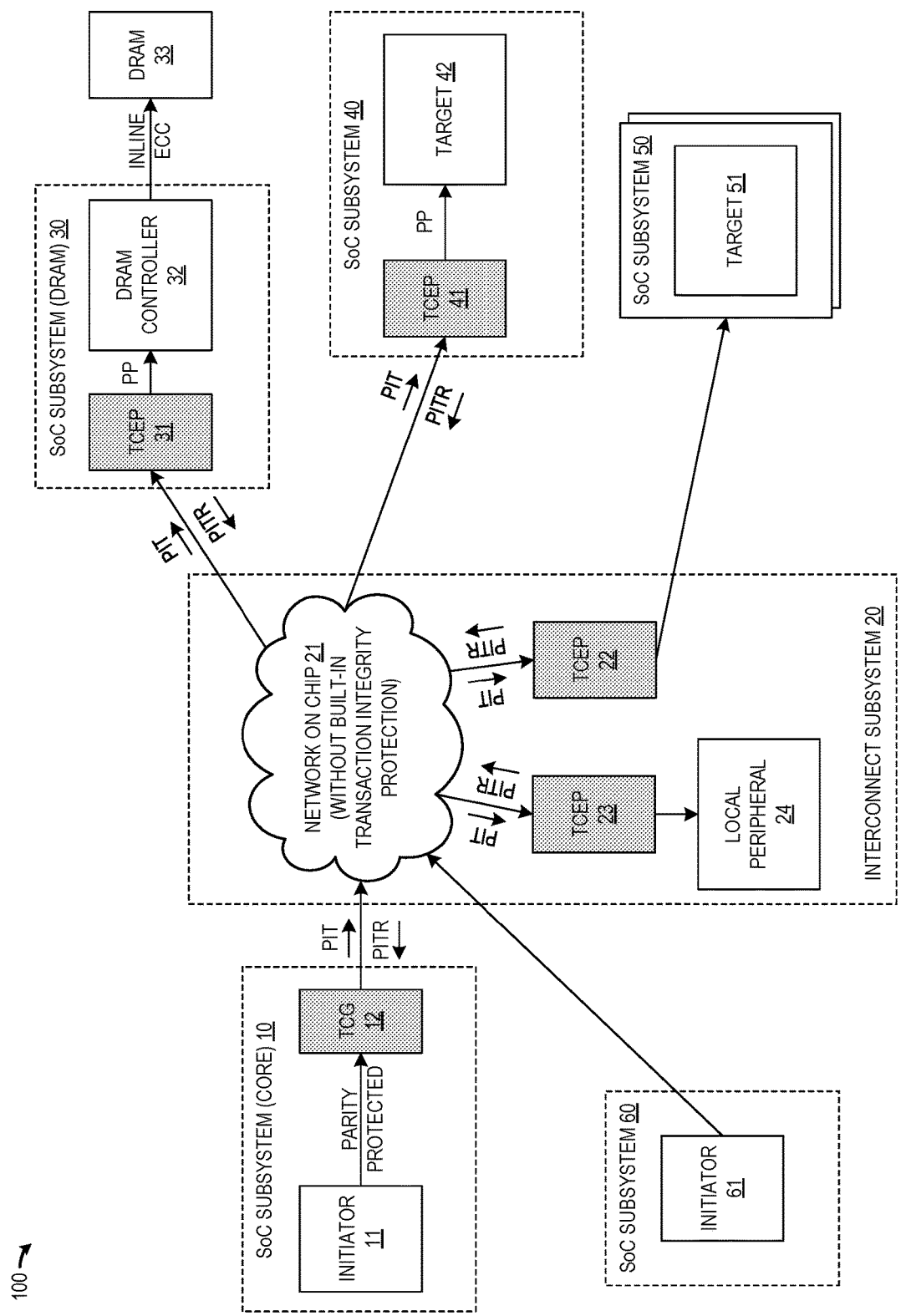
FIG. 1 is a schematic block diagram of a system on a chip (SOC) including transaction checker generator and transaction checker endpoints may be used to provide end-to-end integrity protection over a standard interconnect in accordance with selected embodiments of the present disclosure.

A transaction integrity protection system, apparatus, and method of operation are described for providing end-to-end transaction integrity of regular transactions sent over an interconnect by sending an extra protecting information transaction (PIT) message over the interconnect with each regular transaction to be protected. In selected embodiments, each PIT message includes integrity information (e.g., with cyclic redundancy check (CRC) data or other suitable error-detecting coding techniques) that can be processed to detect faults that may arise when the regular transaction is sent over the interconnect. The disclosed transaction integrity system may be implemented with a Transaction Checker Generator (TCG) hardware circuit and a Transaction Checker EndPoint (TCEP) hardware circuit that are posited on opposite ends of an interconnect path. In operation, the TCG hardware circuit sends the regular transaction and also generates the PIT message for transmission that will be used to protect the regular transaction over the interconnect path. In selected embodiments, the PIT message may be a small (e.g., 32-bits) message which is generated from the regular transaction being protected and includes a user bit and CRC value, along with a shared destination address and transaction ID. The TCG hardware circuit also checks responses to each regular transaction and PIT message to detect any fault that may have happened during transfer over the interconnect path. In addition, the TCEP hardware circuit may be connected and configured to receive the regular transaction and the PIT message and to evaluate the integrity of the regular transaction based on the PIT message, depending on the regular transaction type. For example, the TCEP hardware circuit that receives a regular write transaction may compute protecting information (e.g., CRC data) based on received request information and write data in the regular write transaction, and then compare the computed CRC data to the CRC data received in the PIT message. Alternatively, the TCEP hardware circuit that receives a regular read transaction may compute protecting information (e.g., CRC data) based on received data for the regular read transaction, and then send the protecting information back to the originating TCG hardware circuit in the read data of the PIT message. The TCEP hardware circuit is also configured to generate and check parity information going along with regular transaction toward its final destination. As seen from the foregoing, there is a TCEP hardware circuit located at each end point of an interconnect path that can be reached by a subsystem with a TCG hardware circuit. One category of fault which can occur is the loss or misdirection of an entire packet. This can be managed by both the TCEP and TCG having an expected sequence of packets based on a packet ID. Similar to corruptions detected by CRC errors, a loss (or misdirected packet) can be detected by seeing inconsistencies on the sequence, or by using a timeout when no suitable packet is received.

As seen from the foregoing, there are a number of advantages of the disclosed transaction integrity protection mechanism. First, by providing a transaction integrity system where data integrity is provided by the interconnect transactions and not the underlying interconnect hardware, the content of interconnection transactions can be protected over any interconnect, thereby eliminating the expense, complexity, and silicon overhead of interconnects with integrated data integrity protection features. In selected embodiments, the disclosed transaction integrity protection mechanism may be used with an arbitrary non-safety aware interconnect or similar network, whether embodied entirely on a SOC or between multiple SOC using a general network. As used herein, a non-safety aware interconnect may be understood to refer to any suitable transport mechanism (interconnect/network) which lacks inbuilt mechanisms for error concealment/recovery or to fulfill functional safety requirements, including but not limited to a network-on-chip (NoC) bus which does not include built-in integrity protection structures. And by supporting both non-protected and protected transactions flowing through the interconnect path, there is no overhead required to support non-safety related initiators. As a result, the interconnect need not be modified to add safety capability to a subset of the traffic. In addition, the disclosed transaction integrity protection mechanism enables safety information to be conveyed using standard information packets which are routed independently of the functional packets and with no fixed timing relationship. With this approach, there is low overhead on silicon, reduced design costs associated with the interconnect, and no need to buy expensive IPs. In addition, the small size of the PIT message imposes a minimal impact on the bandwidth of the interconnect path by adding a single 32-bit PIT message to each regular transaction and response.

Various illustrative embodiments of the present invention will now be described in detail with reference to the accompanying figures which illustrate functional and/or logical block components and various processing steps. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected embodiments of the present invention are implemented, for the most part, with electronic components and circuits known to those skilled in the art, and as a result, circuit details have not been explained in any greater extent since such details are well known and not considered necessary to teach one skilled in the art of how to make or use the present invention. In addition, selected aspects are depicted with reference to simplified circuit schematics, logic diagrams, and flow chart drawings without including every circuit detail or feature in order to avoid limiting or obscuring the present invention. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Referring now to FIG. 1, there is depicted schematic block diagram 100 of a system on a chip (SOC) including a plurality of SoC subsystems 10, 30, 40, 50, 60 connected together over an interconnect subsystem 20. As depicted, one or more SoC subsystems 10, 60 are transaction initiators which issue or send transactions over the interconnect subsystem 20 to one or more target SoC subsystems 30, 40, 50 which receive and process and process the transactions. While the interconnect subsystem 20 is illustrated as being implemented with a network-on-chip (NoC) 21 which does not include built-in transaction integrity protection, it will be appreciated that any suitable interconnect or crossbar switch may be used (e.g., DMB/DBS/AXI/SSI).

For any initiating SoC subsystem which issues transactions having integrity requirements (e.g., SoC subsystem core 10), an initiator module 11 (e.g., a Cortex-M4 CPU or other System Controller Unit (SCU)) is connected over a parity-protected path (e.g., Advanced High-performance Bus) to a Transaction Checker Generator (TCG) 12 which is connected and configured to send regular transactions (not shown) along with accompanying PIT messages over the interconnect subsystem 20. As disclosed, each PIT message includes one or more user bit fields which are set to identify the transaction as a PIT message, and also includes the same destination address and transaction ID as the regular transaction being protected so that it is directed to the same target SoC subsystem as the regular transaction. In addition, each TCG (e.g., 12) is connected and configured to receive regular transaction responses (not shown) along with accompanying PIT response (PITR) messages which are returned over the interconnect subsystem 20 by the target SoC subsystem. However, for initiating SoC subsystems which issue transactions that do not have integrity requirements (e.g., SoC subsystem 60), an initiator module 61 is connected and configured to send transactions directly over the interconnect subsystem 20.

In similar fashion, for any target SoC subsystem which processes transactions having integrity requirements, a Transaction Checker EndPoint (TCEP) is connected to receive and process transactions from the interconnect subsystem 20 and to communicate over a parity-protected path (e.g., AXI/SSI bus) to a target module. In addition, each TCEP is connected and configured to generate regular transaction responses (not shown) along with accompanying PIT response (PITR) messages which are returned over the interconnect subsystem 20 to the initiating SoC subsystem. For example, the DRAM SoC subsystem 30 includes a TCEP 31 that is connected to receive and process memory access transactions from the interconnect subsystem 20 by communicating over the parity-protected path to the DRAM controller 32 (which communicates over an inline ECC path with the DRAM memory 33) and by generating regular transaction responses (not shown) along with accompanying PIT response (PITR) messages for return to the initiating SoC subsystem. In similar fashion, the SoC subsystem 40 includes a TCEP 41 that is connected to receive and process transactions from the interconnect subsystem 20 and to communicate over the parity-protected path to the target module 42. However, for any target SoC subsystems 50 that do not have integrity requirements, a target module 51 may be directly connected to receive and process transactions from the interconnect subsystem 20.

In selected embodiments, the TCEP functionality is not be incorporated in each target SoC subsystem, but may instead be integrated within the interconnect subsystem 20. For example, interconnect subsystem 20 may include a TCEP 23 that is connected to receive and process transactions from the NoC 21 and to communicate with the local peripheral module 24 at the interconnect subsystem 20. In similar fashion, the interconnect subsystem 20 includes a TCEP 22 that is connected to receive and process transactions from the NoC 21 and to communicate to the target module 51.

By positioning the TCG 12 at each initiating SoC subsystem along with one or more TCEPs 22, 23, 31, 41 at the target SoC subsystem(s), transactions from safety-related initiator SoC subsystems that are sent over a standard interconnect 20 can be protected by generating PIT and PTIR messages which are exchanged to achieve transaction integrity over the interconnect path. Implementation at the system level requires one TCG at each initiator SoC subsystem which issues transactions having integrity requirements. For each transaction issued by the initiator (a.k.a. regular transaction) which requires integrity protection, the TCG generates the PIT (Protecting Information Transaction) that is transmitted along with the regular transaction over the interconnect 20, and also handles the response to the PIT (PITR). System level implementation also includes one TCEP per destination SoC subsystem that can be reached by the protected transactions, where each TCEP is configured to compute the response to the PIT transaction for transmission over the interconnect 20 to the initiator SoC subsystem.

In generating a PIT or PITR message, the TCG or TCEP may generate each PIT or PITR message to be formatted to look like a regular transaction, but to also include protecting information. For example, selected embodiments of the PIT message may include the same destination address as the regular transaction (aligned on 32-bits boundary) and the same transaction ID as the regular transaction. In addition, the PIT message may include one or more user bit fields set to a first value (e.g., 0b1) to identify the transaction as a PIT message or to a second value (e.g., 0b0) to identify the transaction as a regular transaction. In selected embodiments, the user bit field could be triplicated to be resistant to a bit flip. In addition, the generated PIT message may include protecting information that is computed by using the CRC-32 checksum algorithm from ITU-T V.42 protocol to detect data corruption in the protected regular transaction, though any suitable error detection/correction protocol may be used. As will be appreciated, the PITR messages may be formatted to include the same information as the regular transaction response messages, such as destination address, and may also include protecting information computed at the TCEP.

By positioning the TCG and TCEP circuits at the periphery of the interconnect subsystem 20 as shown, the data integrity protection for regular transactions sent over the interconnect subsystem 20 may be implemented with a synchronous integrity mode or an asynchronous integrity mode. With the synchronous integrity mode, the TCG circuit generates a response to a regular transaction issued by an initiator SoC subsystem only after the PIT response comes back to the TCG. While the synchronous mode of protection, the integrity protection mechanism imposes a latency requirement since initiating SoC subsystem sees a transaction duration that is long enough to allow the regular transaction and response to fully navigate over the interconnect subsystem 20. However, with the asynchronous integrity mode, the TCG circuit generates an immediate response to a regular transaction issued by an initiator SoC subsystem, and if an error is detected when the PIT response comes back to the TCG, then the TCG generates an interrupt to signal there has been a PIT error. Thus, the protection mechanism provided in the asynchronous mode of protection has no impact on the latency seen by the initiator since the transaction response is provided more quickly. In case of an initiating processor core subsystem, this may result in the execution or consumption of corrupted code or data, but the issuance of an interrupt may be then used to delete the corrupted code/data operation.

Figure 2:
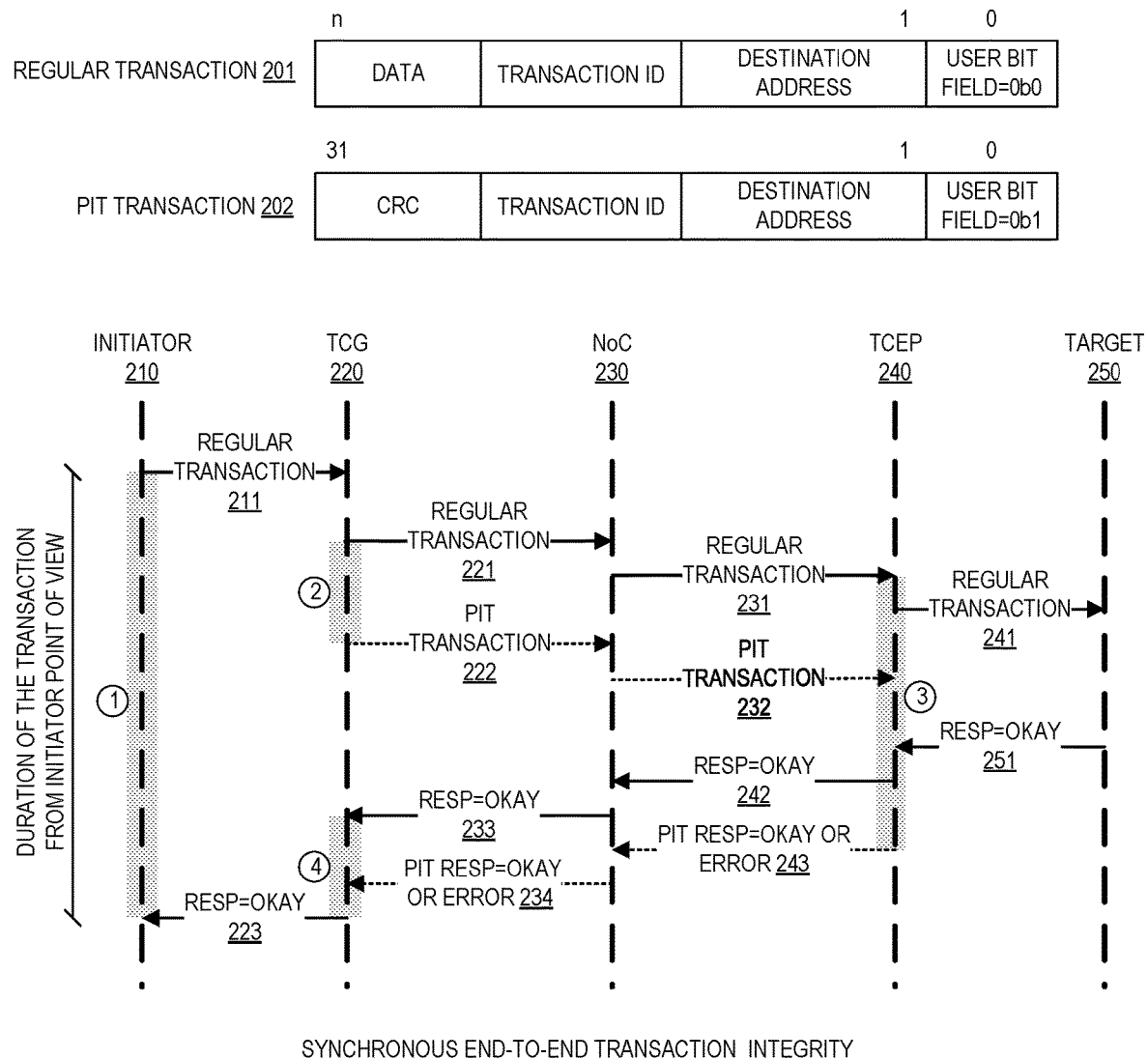
FIG. 2 is a diagrammatic illustration of the transactions handle by SOC subsystems to provide synchronous end-to-end integrity in accordance with selected embodiments of the present disclosure.

For an improved understanding of selected embodiments of the present disclosure, reference is now made to FIG. 2 which depicts a simplified diagrammatic illustration of the transactions handle by SoC subsystems 210, 250 which include TCG unit 220 and TCEP unit 240 to provide synchronous end-to-end integrity for communications over the NoC subsystem 230. As a first step (1), the initiator subsystem 210 issues a regular transaction 211 which is sent to the TCG unit 220. As will be appreciated, the regular transaction 211 may be a memory access request, such as a memory write request or memory read request. The regular transaction may have any suitable message format. For example, the depicted regular transaction 201 is shown as an n-bit message that includes a user bit field set to first value (e.g., 0), a destination address field, a transaction ID field, and a data field.

At a second step (2), the TCG unit 220 forwards the regular transaction 221 to the NoC subsystem 230. In addition, the TCG unit 220 generates and forwards a PIT transaction 222 to the NoC subsystem 230 shortly after forwarding the regular transaction 221. The PIT transaction may also have any suitable message format. For example, the depicted PIT transaction 202 is shown as a 32-bit message that includes a user bit field set to second value (e.g., 1), a destination address field, a transaction ID field, and a CRC data field. As disclosed herein, the contents of the PIT transaction fields will depend on the type of regular transaction being protected. For example, the TCG unit 220 may compute integrity information for a regular write transaction by using the write address and data fields to compute a CRC value, and then generating the 32-bit non-modifiable write carrying PIT transaction 222. Alternatively, the TCG unit 220 may start to compute integrity information for a regular read transaction by storing the read address of the regular transaction for subsequent retrieval, and then generating the 32-bit non-modifiable read PIT transaction 222.

At the NoC subsystem 230, the regular transaction 221 and PIT transaction 222 are received and forwarded to the TCEP unit 240, respectively, as the regular transaction 231 and PIT transaction 232. In embodiments where the NoC subsystem 230 is a standard interconnect that does not include built-in integrity protection structures, the transactions 221, 222 are forwarded with little or no delay since there is no latency caused by complex transaction processing.

At a third step (3), the TCEP unit 240 responds to the regular transaction 231 by forwarding the regular transaction 241 to the target SoC subsystem 250. In addition, the TCEP unit 240 receives the forwarded PIT transaction 232 and then awaits receipt of the response message 251 from the target SoC subsystem 250 before computing the response message 242 and PIT response message 243. After receiving the response message 251 from the target SoC subsystem 250, the TCEP unit 240 forwards it as the response message 242 to the NoC subsystem 230. In addition, the TCEP unit 240 computes a PIT response message 243. The response message 242 and PIT response message 243 may have any suitable message format and may include, for example, a user bit field, a destination address field, a transaction ID field, and a payload field. As disclosed herein, the contents of the PIT response message fields will depend on the type of regular transaction being protected.

For example, the TCEP unit 240 may compute the expected integrity protecting information for a regular write transaction by using the write address and data contained in the regular transaction 231 to compute local integrity information (e.g., local CRC values). To account for regular write transactions that are split by the NoC subsystem 230, the TCEP unit 240 may be configured to use only the write address from the first regular transaction 231 and to keep computing integrity information with data from additional regular transaction(s) 231 only as long as it receives regular transactions until a PIT transaction (e.g., 232) is received that corresponds to the regular transaction (e.g., 231). Upon receiving the PIT transaction 232, the TCEP 240 checks that the integrity information (e.g., CRC values) received with the PIT transaction 232 corresponds to the local integrity information, and also compares the write address from the PIT transaction 232 with the write address of the first regular transaction 231. If the received integrity information matches the local integrity information and if there is a match between the write addresses of the PIT transaction 232 and first regular transaction 231, the TCEP unit 240 generates the "OKAY" PIT response message 243, but if they do not match, then the TCEP unit 240 generates the "ERROR" PIT response message 243.

Alternatively, the TCEP unit 240 may compute the expected integrity information for a regular read transaction by beginning computation of local integrity information (e.g., local CRC values) using the read address of the regular transaction 231, and then updating the computation of the local integrity information with the read data returned in the read data response message 251 from the target SoC subsystem 250. To account for regular read transactions that are split by the NoC subsystem 230, the TCEP unit 240 may be configured to use only the read address from the first regular transaction 231. The TCEP unit 240 also forwards read data response message 251 to the NoC subsystem 230 as a forwarded response message 242 along with the PIT response message 243. If the read data response message 251 to the regular transaction 241 is ERROR, then the integrity information is corrupted before being sent to the NoC subsystem 230, in which case the TCEP unit 240 generates the "ERROR" PIT response message 243. Otherwise, the TCEP unit 240 generates the "OKAY" PIT response message 243 which includes the local integrity information (e.g., local CRC values).

At the NoC subsystem 230, the regular response message 242 and PIT response message 243 are received and forwarded to the TCG unit 220, respectively as the regular response message 233 and PIT response message 234. In embodiments where the NoC subsystem 230 is a standard interconnect that does not include built-in integrity protection structures, the response messages 233, 234 are forwarded with little or no delay since there is no latency caused by complex transaction processing.

At a fourth step (4), the TCG unit 220 checks the regular response message 233 and PIT response message 234 received from the NoC subsystem 230 and generates a final response message 223 for the initiator subsystem 210 that depends on the type of regular transaction being protected. For a write transaction, the TCG unit 220 generates an "OKAY" final write response message 223 if both the regular response message 233 and PIT response message 234 are OKAY messages, but otherwise generates an "ERROR" final write response message 223. For a read transaction, the TCG unit 220 may complete or update the computation of the expected integrity information by retrieving the previously-stored read address from memory (stored at step (2)), and then computing the local integrity protecting information (e.g., local CRC values) for the regular read transaction from the retrieved read address and read data contained in the regular response message 233. If the received integrity information in the PIT response message 234 matches the local integrity protecting information and if both the regular response message 233 and PIT response message 234 are "OKAY" messages, then the TCG unit 220 generates the final read response message 223 to include an "OKAY" response message 243, but otherwise generates an "ERROR" final read response message 223. This implementation adds latency to read transaction to provide in-band bus error response since the initiator subsystem 210 gets the status of its transaction in-band with the delivery of the final response message 223, and total duration of the transaction from the initiator point of view provides sufficient time for the synchronous end-to-end transaction integrity to be confirmed before generating the final response message 223.

Figure 3:
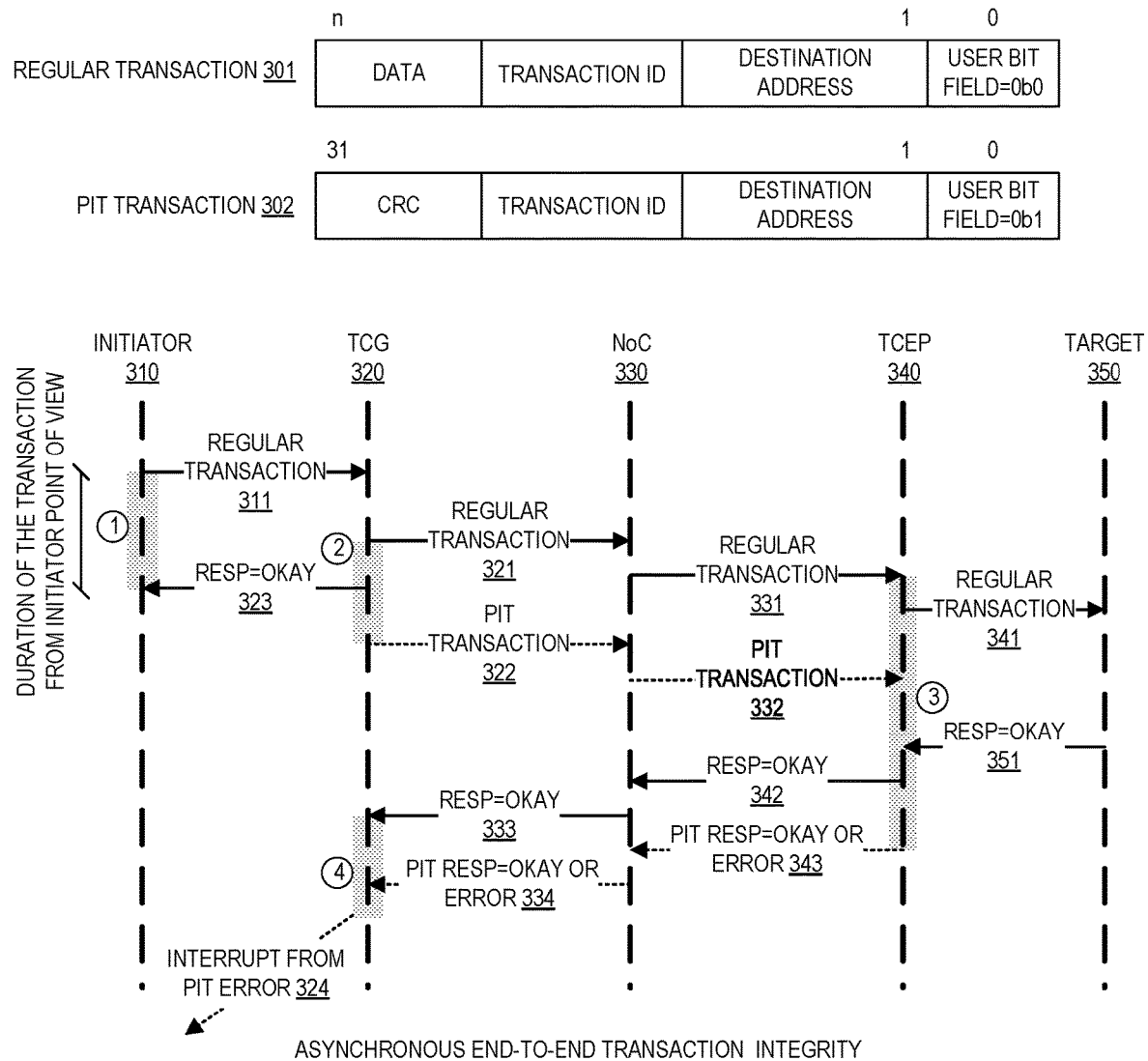
FIG. 3 is a diagrammatic illustration of the transactions handle by SOC subsystems to provide asynchronous end-to-end integrity in accordance with selected embodiments of the present disclosure.

For an improved understanding of selected embodiments of the present disclosure, reference is now made to FIG. 3 which depicts a simplified diagrammatic illustration of the transactions handle by SoC subsystems 310, 350 which include TCG unit 320 and TCEP unit 340 to provide asynchronous end-to-end integrity for communications over the NoC subsystem 330. In the depicted asynchronous integrity mode, when the initiator subsystem 310 issues a regular transaction 311, the final response message 323 to the initiator subsystem 310 is not held until the PIT response message 334 is received, but is instead issued without delay and then recalled or aborted only later if an interrupt message 324 is issued in the event the PIT response message 334 indicates there was data error during delivery of the regular transaction over the NoC subsystem 330. For example, there are protocols, like AHB, that support posted write operations with the early response capabilities in which the final response message 323 is returned to the initiator subsystem 310 for a write transaction. With the asynchronous integrity mode of operation, there is reduced latency for the duration of the transaction for non-corrupted regular transactions since the final response message 323 is returned to the initiator subsystem 310 after only a short delay.

As indicated, the steps for providing asynchronous end-to-end integrity are very similar to the steps for providing synchronous end-to-end integrity, starting with a first step (1) where the initiator subsystem 310 sends a regular transaction 311, such as a memory access request, to the TCG unit 320. The regular transaction may have any suitable message format, such as the depicted regular transaction 301 which is an n-bit message including a user bit field set to first value (e.g., 0), a destination address field, a transaction ID field, and a data field.

At a second step (2), the TCG unit 320 forwards the regular transaction 321 to the NoC subsystem 330. In addition, the TCG unit 320 sends an "OKAY" final response message 323 to the initiator subsystem 310 without waiting to determine if there was a data error during delivery of the regular transaction over the NoC subsystem 330. The TCG unit 320 also generates and forwards a PIT transaction 322 to the NoC subsystem 330 shortly after forwarding the regular transaction 321. The PIT transaction may also have any suitable message format, such as the depicted PIT transaction 302 which is a 32-bit message including a user bit field set to second value (e.g., 1), a destination address field, a transaction ID field, and a CRC data field. For write transactions, the TCG unit 320 generates the PIT transaction 322 by computing integrity information (e.g., CRC values) from the write address and data fields, and then generating the 32-bit non-modifiable write carrying PIT transaction 322 to include the computed integrity information. For read transactions, the TCG unit 320 starts to compute integrity information by storing the read address of the regular transaction for subsequent retrieval, and then generates the 32-bit non-modifiable read PIT transaction 322. To support asynchronous integrity operations, the TCG unit 320 may include a timer function that measures the time from issuance of the regular transaction 321 to the NoC subsystem 330 until the reception of the PIT response 332 from the NoC subsystem 330. If the timer expires, then the transaction is considered as lost, and the TCG unit 320 triggers an interrupt message 324.

After the NoC subsystem 330 receives and forwards the regular transaction 321 and PIT transaction 322 to the TCEP unit 340, respectively, as the regular transaction 331 and PIT transaction 332, the TCEP unit 340 performs the third step (3) by forwarding the regular transaction 341 to the target SoC subsystem 350. In addition, the TCEP unit 340 receives the forwarded PIT transaction 332 and then awaits receipt of the response message 351 from the target SoC subsystem 350 before computing the response message 342 and PIT response message 343. In particular, after receiving the response message 351 from the target SoC subsystem 350, the TCEP unit 340 forwards it as the response message 342 to the NoC subsystem 330. In addition, the TCEP unit 340 computes a PIT response message 343, where the response message 342 and PIT response message 343 may have any suitable message format that includes, for example, a user bit field, a destination address field, a transaction ID field, and a payload field. As disclosed herein, the contents of the PIT response message fields will depend on the type of regular transaction being protected.

For write transactions, the TCEP unit 340 may compute the expected integrity protecting information (e.g., local CRC values) from a write address in a first regular transaction 331 and from data contained in the regular transaction (s) 331. To account for regular write transactions that are split by the NoC subsystem 330, the TCEP unit 340 may be configured to continue computing integrity information with data from additional regular transaction(s) 331 until a PIT transaction (e.g., 332) is received that corresponds to the regular transaction (e.g., 331). Upon receiving the PIT transaction 332, the TCEP 340 checks that the integrity information (e.g., CRC values) received with the PIT transaction 332 corresponds to the local integrity information, and also compares the write address from the PIT transaction 332 with the write address of the first regular transaction 331. If the received integrity information matches the local integrity information and if there is a match between the write addresses of the PIT transaction 332 and first regular transaction 331, the TCEP unit 340 generates the "OKAY" PIT response message 343. However, if they do not match, then the TCEP unit 340 generates the "ERROR" PIT response message 343.

For read transactions, the TCEP unit 340 may compute the expected integrity information by beginning computation of local integrity information (e.g., local CRC values) using the read address of the regular transaction 331, and then updating the computation of the local integrity information with the read data returned in the read data response message 351 from the target SoC subsystem 350. To account for regular read transactions that are split by the NoC subsystem 330, the TCEP unit 340 may be configured to use only the read address from the first regular transaction 331. The TCEP unit 340 also forwards read data response message 351 to the NoC subsystem 330 as a forwarded response message 342 along with the PIT response message 343. If the read data response message 351 to the regular transaction 341 is ERROR, then the integrity information is corrupted before being sent to the NoC subsystem 330, in which case the TCEP unit 340 generates the "ERROR" PIT response message 343. Otherwise, the TCEP unit 340 generates the "OKAY" PIT response message 343 which includes the local integrity information (e.g., local CRC values).

After the NoC subsystem 330 receives and forwards the regular response message 333 and PIT response message 334 to the TCG unit 320, the TCG unit 320 performs the fourth step (4) by checking the regular response message 333 and PIT response message 334 received from the NoC subsystem 330 to detect if there was a data error during delivery of the regular transaction over the NoC subsystem 330. If no data error is detected, then the TCG unit 320 does not send any additional response message to the initiator subsystem 310 since the "OKAY" final response message 323 was previously sent to indicate that the regular transaction was successfully transmitted. However, if a data error is detected, then the TCG unit 320 sends an interrupt message 324 to the initiator subsystem 310. For write transactions, the TCG unit 320 detects a data error if either the regular response message 333 and/or the PIT response message 334 are ERROR messages, and then issues the interrupt message 324. For a read transaction, the TCG unit 320 detects a data error by completing or updating the computation of the expected integrity information by retrieving the previously-stored read address from memory (stored at step (2)), and then computing the local integrity protecting information (e.g., local CRC values) for the regular read transaction from the retrieved read address and read data contained in the regular response message 333. If the received integrity information in the PIT response message 334 does not match the local integrity protecting information or if either the regular response message 333 and/or PIT response message 334 are "ERROR" messages, then the TCG unit 320 issues the interrupt message 324. In this way, the initiator subsystem 310 obtains the real status of its transaction through an out of band interrupt message 324.

As described hereinabove, the integrity information may be computed from the memory access address and data associated with a regular transaction. However, the integrity information may also be computed from any suitable side band information that is supposed to remain invariant during transmission over the NoC subsystem. As a result of generating extra protecting information transaction (PIT) messages that are sent over the interconnect, a number of different data errors can be detected.

For example, an error in the read or write data can be detected as the simplest case since such an error will result in a mismatch between the locally computed integrity information and the integrity information carried by the PIT message. When such a mismatch occurs, the TCG unit generates an "ERROR" final write response message (e.g., 223) from the TCG unit to the initiator in the case of synchronous integrity operation. Alternatively, the TCG unit generates an interrupt triggered (e.g., 324) by the TCG unit in the case of asynchronous integrity operation.

In addition, an error in the transaction ID that arises during transmission over the NoC subsystem can be detected when the TCEP unit cannot reconcile the received regular transaction with the received PIT transaction. When this occurs the TCEP unit generates an "ERROR" PIT response message (e.g., 243, 343).

In addition, an error in the address that arises during transmission over the NoC subsystem can be detected since the regular transaction and PIT message will not reach the same TCEP unit. For example, if the regular transaction is delivered to a first TCEP unit at a specified address and obtains a response message, that first TCEP unit will never receive associated PIT message if there was an address error. And if the first TCEP unit receives a new regular transaction with its associated PIT message, the first TCEP unit will keep updating the integrity information, thereby triggering a mismatch and an error for this second transaction. Likewise, if a second TCEP unit receives the PIT message that was intended to protect the regular transaction but does not also receive the regular transaction, then the second TCEP unit responds to the PIT message by generating an "ERROR" PIT response message (e.g., 243, 343).

In addition, an error in the user bit field that arises during transmission over the NoC subsystem can be detected or at least ignored. For example, if the error in the user bit field changes a regular transaction into a (misidentified) PIT message, then the TCEP unit may be configured to treat any (misidentified) PIT message that is not 32-bits long as a regular transaction by forwarding it to the destination address, resulting in a safe or harmless error. However, if the (misidentified) PIT message is 32-bits long, then the TCEP unit may be configured to treat the (misidentified) PIT message as a PIT message. If there was an on-going computation of protecting information, then the PIT response generated by the TCEP unit will be based on the state of that computation.

If an error in the user bit field that arises during transmission over the NoC subsystem changes a PIT message into a (misidentified) regular transaction, then the TCEP unit will forward the (misidentified) regular transaction to its target destination where any write transaction will corrupt the destination address, and where any read transaction will very likely trigger a mismatch at the TCG unit. Even if these events do not occur, the next regular transaction received by the TCEP unit will generate an error. For example, if the next regular transaction is not the same type (read or write) as the (misidentified) regular transaction, the TCEP unit will detect that that the PIT message for the (misidentified) regular transact was missing. And even if the next regular transaction is the same type (read or write) as the (misidentified) regular transaction, the TCEP unit will continue to update the protecting information while waiting for the PIT message until the timer will be triggered to indicate a data error.

Figure 4:
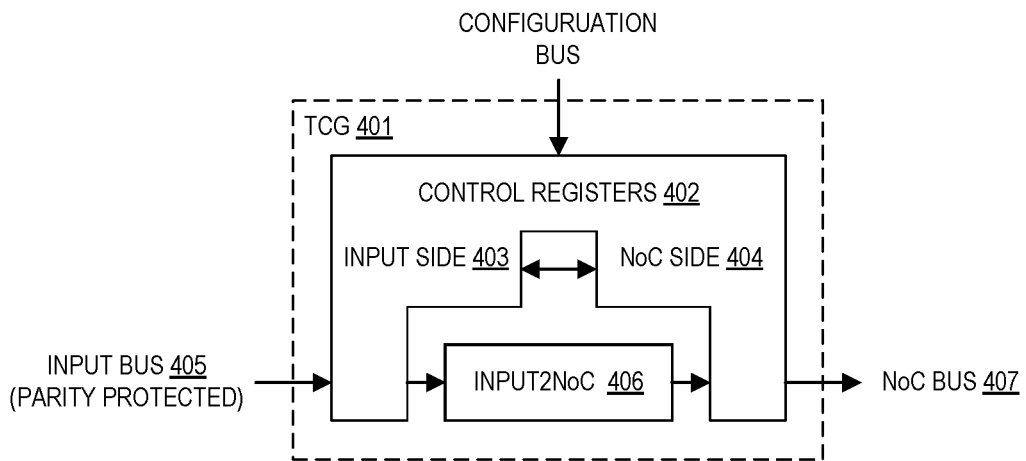
FIG. 4 is a simplified schematic block diagram of a transaction checker generator which uses one or more registers to implement a protocol converter in accordance with selected embodiments of the present disclosure.

To the extent that the regular transaction and PIT messages can be formatted to provide the user bit field with redundant bit values (e.g., triplicating the user bit value), then user bit field errors can be avoided For an improved understanding of selected embodiments of the present disclosure, reference is now made to FIG. 4 which depicts a simplified schematic block diagram 400 of a transaction checker generator (TCG) hardware circuit 401 which uses one or more control registers 402 and an Input2NoC protocol converter 406 to convert parity-protected transactions on the input bus 405 to transactions on the NoC bus 407. As depicted, the control registers 402 include TCG input side control logic 403 and TCG NoC side control logic 404 to schedule and check regular transactions and PIT messages received on the input bus 405 for transmission over the NoC bus 407. Under control of the control registers 402 configured by the configuration bus, the TCG input side 403 starts computing protecting information when a regular transaction is received, and then notifies the TCG NoC side 404 that there is a PIT message to send. For write access regular transactions, the TCG input side 403 updates the protection information until the write regular transaction is completed, and then notifies the TCG NoC side 404 that a data phase of PIT write message can be sent over the NoC bus 407. For read access regular transactions, the TCG input side 403 completes the updating of the protecting information with read data received from the NoC bus 407, and then compares the updated protecting information with the protecting information received on the NoC bus 407 from a PIT response message to determine if there was a data error during delivery of the read access regular transaction over the NoC bus 407. The control registers 402 are also configured by the configuration bus to control the TCG NoC side 404 to detect and send a new PIT message that corresponds to the regular transaction by using the same transaction ID and address and that is a non-modifiable transaction. Thus, the TCG hardware circuit 401 does not add extra cycles on the address and data phase of a regular transaction that flows through the Input2NoC protocol converter 406. The only impact is on the response that is delayed until the PIT response message is received.

Figure 5:
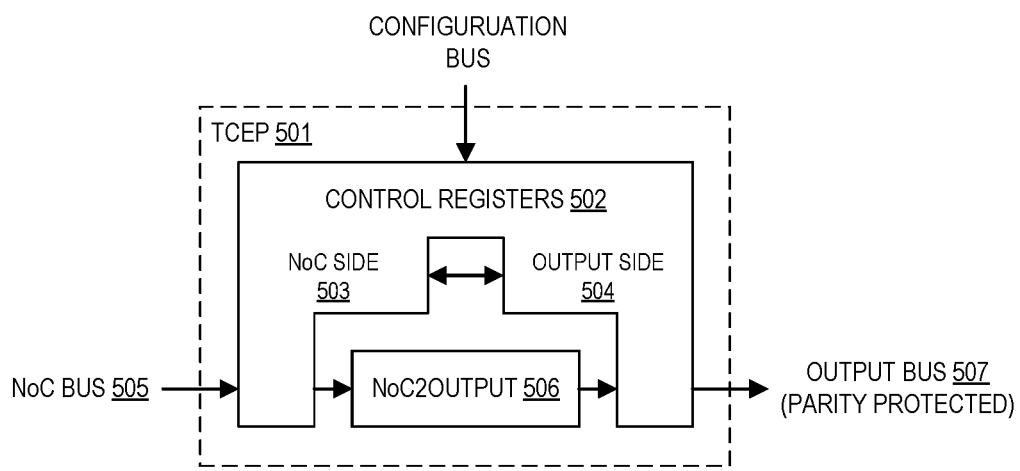
FIG. 5 is a simplified schematic block diagram of a transaction checker endpoint which uses one or more registers to implement a protocol converter in accordance with selected embodiments of the present disclosure.

For an improved understanding of selected embodiments of the present disclosure, reference is now made to FIG. 5 which depicts a simplified schematic block diagram 500 of a transaction checker endpoint (TCEP) hardware circuit 501 which uses one or more control registers 502 and an NoC2Input protocol converter 506 to convert transactions on the NoC bus 505 to parity-protected transactions on the output bus 507. As depicted, the control registers 502 include TCEP NoC input side control logic 503 and TCEP output side control logic 504 to schedule and check regular transactions and PIT messages received on the NoC bus 505 for transmission over the output bus 507. Under control of the control registers 502 configured by the configuration bus, the TCEP hardware circuit 501 is the endpoint of PIT messages. For each regular write transaction, the TCEP NoC input side 503 of the TCEP hardware circuit 501 computes protecting information based on the received write request and write data from the regular write transaction before notifying the TCEP output side 504 that a regular write transaction can be sent over the output bus 507 to the destination or target subsystem, and then compares the locally computed protecting information to protecting information received in a PIT message corresponding to the regular write transaction that is received on the NoC input bus 505. For each regular read transaction, the TCEP output side 504 of the TCEP hardware circuit 501 computes protecting information based on the received read request (received from the regular read transaction) and read data (received from the destination or target subsystem), and then sends the protecting information back to the TCG hardware circuit in the PIT response message. The TCEP hardware circuit 501 also generates and checks parity information going along with regular transaction toward its final destination.

Figure 6:
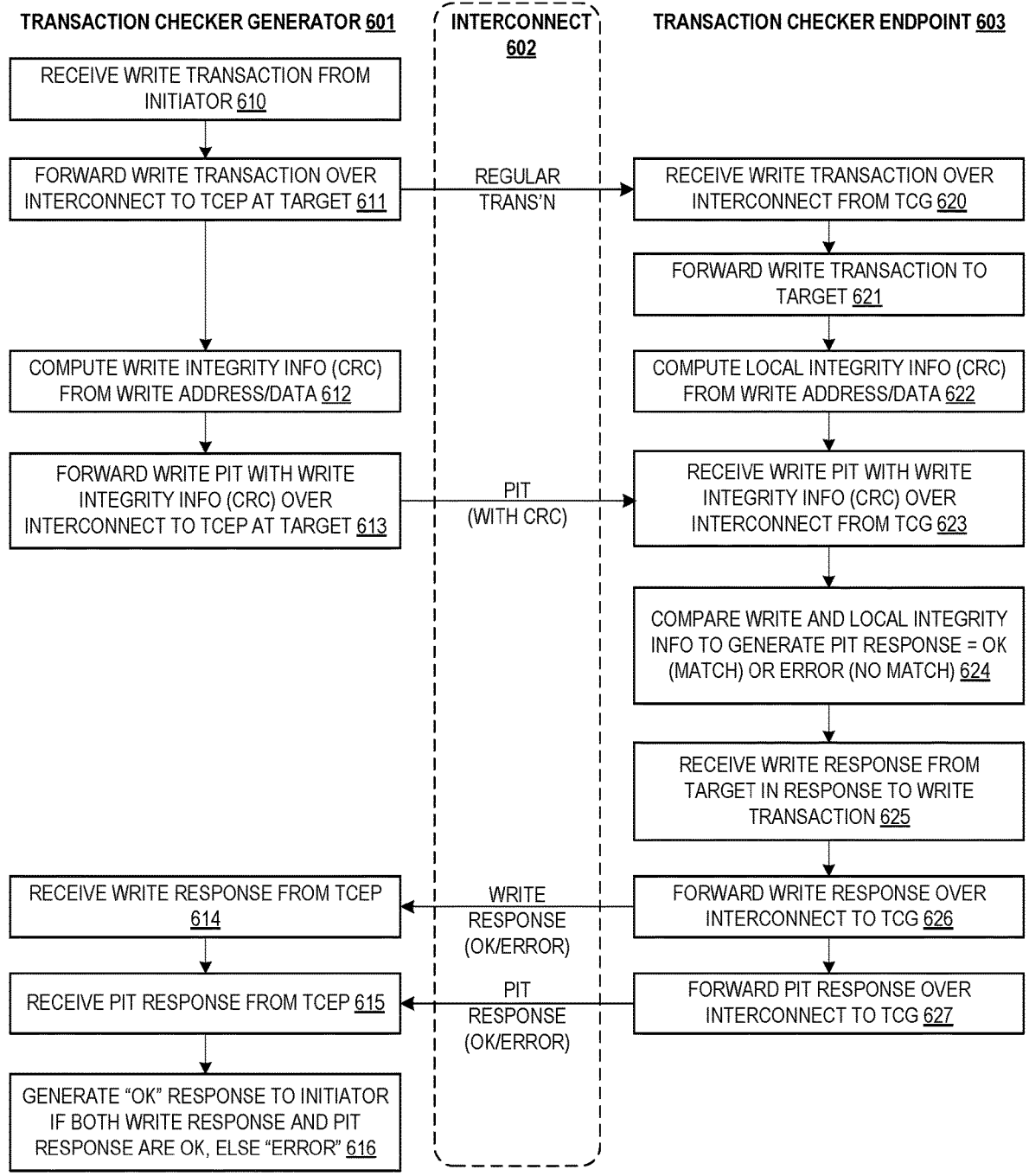
FIG. 6 is a simplified flow chart showing a sequence of steps performed by a transaction checker generator and transaction checker endpoint when handling write transactions in a synchronous integrity mode in accordance with selected embodiments of the present disclosure.

For an improved understanding of selected embodiments of the present disclosure, reference is now made to FIG. 6 which depicts a simplified flow chart 600 showing a communication sequence of steps performed by a transaction checker generator 601 and transaction checker endpoint 603 when handling write transactions over an interconnect 602 in a synchronous integrity mode to provide end-to-end transaction integrity over the interconnect 602. As discussed above, the transaction checker generator 601 may be part of an SoC system in which an initiator subsystem (not shown), such as a Cortex-M4 subsystem, generates one or more write transactions that are transmitted over the interconnect 602. In addition, the transaction checker endpoint 603 may also be part of the SoC system as part of a destination or target subsystem (not shown), such as a DRAM memory controller subsystem, which is connected to receive and process the write transaction(s). In such embodiments, the interconnect 602 may be embodied as a standard interconnect, such as, for example, an Intel® Quick Path Interconnect (QM) interconnect, though any suitable interconnect bus 602 may be used, such as a crossbar switch fabric, for example) that allows the initiator subsystem to access any destination or target subsystem, and that conversely allows data and/or response messages to be returned from any destination or target subsystem to any initiator subsystem.

At step 610, the transaction checker generator (TCG) 601 receives a write transaction from the initiator subsystem (not shown). In selected embodiments, the write transaction includes a write address, a transaction ID, and write data that are to be written to a destination or target subsystem, such as DRAM memory on the SoC system.

At step 611, the TCG 601 forwards the write transaction over the interconnect 602 to the transaction checker endpoint (TCEP) 603. In selected embodiments, the TCG formats the write transaction as a regular write transaction which includes a destination address for the destination or target subsystem, a transaction ID, one or more user bit fields which are set to a first value (e.g., 0b1) to identify the write transaction as a regular transaction, and write data which is to be stored or written to the destination or target subsystem.

At step 620, the TCEP 603 receives the write transaction over the interconnect 602 from the TCG 601. In embodiments where the interconnect 602 is a standard interconnect (e.g., one that does not include integrity-protecting logic or circuitry), the regular write transaction that is received at the TCEP 603 may include a data error or fault that arose during transmission over the interconnect 602. However, at this point in the communication sequence, any such error is not detected, and the TCEP 603 forwards the write transaction to the destination or target subsystem as a non-modifiable transaction (step 621).

In order to detect potential data errors in the regular write transaction that arose during transmission over the interconnect 602, the TCG 601 initiates an error detection sequence at step 612 by computing write integrity information from the transmitted regular write transaction. In selected embodiments, the write integrity information may be computed by computing CRC values from the write destination address and transaction ID using the CRC-32 checksum algorithm from ITU-T V.42 protocol.

In similar fashion, the TCEP 603 initiates an error detection sequence at step 622 by computing local integrity information from the received regular write transaction. In selected embodiments, the local integrity information may be computed by computing CRC values from the write destination address and transaction ID using the CRC-32 checksum algorithm from ITU-T V.42 protocol.

To enable a comparison of the write and local integrity information, the TCG 601 generates and forwards a write protecting information transaction (PIT) message at step 613 over the interconnect 602 to the TCEP 603. In selected embodiments, the write PIT message sent by the TCG 601 may be formatted to include the write integrity information (CRC) along with the same destination address and transaction ID as the regular write transaction, and to also include the one or more user bit fields which are set to a second value (e.g., 0b0) to identify the message as a PIT message.

At step 623, the TCEP 603 receives the write PIT message (including the write integrity information (CRC)) over the interconnect 602 from the TCG 601. At step 624, the TCEP 603 can compare the write integrity information (computed by the TCG 601) to the local integrity information (computed by the TCEP 603) to see if there is a match, and then generate a PIT response message based on the results of the match comparison. If the write and local integrity information match, then there is no error detected from the transmission of the regular write transaction over the interconnect 602, and the TCEP 603 generates the PIT response message to include a transmission "OK" indication. However, if the write and local integrity information do not match, this indicates that an error occurred during transmission of the regular write transaction over the interconnect 602, in which case the TCEP 603 generates the PIT response message to include a transmission "ERROR" indication.

At step 625, the TCEP 603 receives a write response message from the destination or target subsystem that was generated in response to the write transaction that was forwarded at step 621. As will be appreciated, the write response message from the destination/target subsystem can be received before or after the write integrity information is received and compared to the local integrity information.

At step 626, the TCEP 603 forwards the write response message over the interconnect 602 to the TCG 601. If the write response message from the destination/target subsystem indicates there was no error during the write operation, and the TCEP 603 generates the write response message to include a write "OK" indication. However, if the write response message from the destination/target subsystem indicates there was an error during the write operation, and the TCEP 603 generates the write response message to include a write "ERROR" indication.

At step 627, the TCEP 603 forwards the PIT response message over the interconnect 602 to the TCG 601. As indicated above, the PIT response message includes a transmission "OK" indication if the comparison step 624 indicates that the write and local integrity information match, and includes a transmission "ERROR" indication if the comparison step 624 indicates that the write and local integrity information do not match. As will be appreciated, the write response message can be sent before or after sending the PIT response message.

At step 614, the TCG 601 receives the write response message over the interconnect 602 from the TCEP 603. And at step 615, the TCG 601 receives the PIT response message over the interconnect 602 from the TCEP 603. Again, the order of steps 614 and 615 can be reversed.

At step 616, the TCG 601 generates and sends an "OK" response message to the initiator subsystem if both the write response and PIT response messages include "OK" indications. However, if either or both of the write response and PIT response messages include an "ERROR" indication, then the TCG 601 generates and sends an "ERROR" response message to the initiator subsystem.

Figure 7:
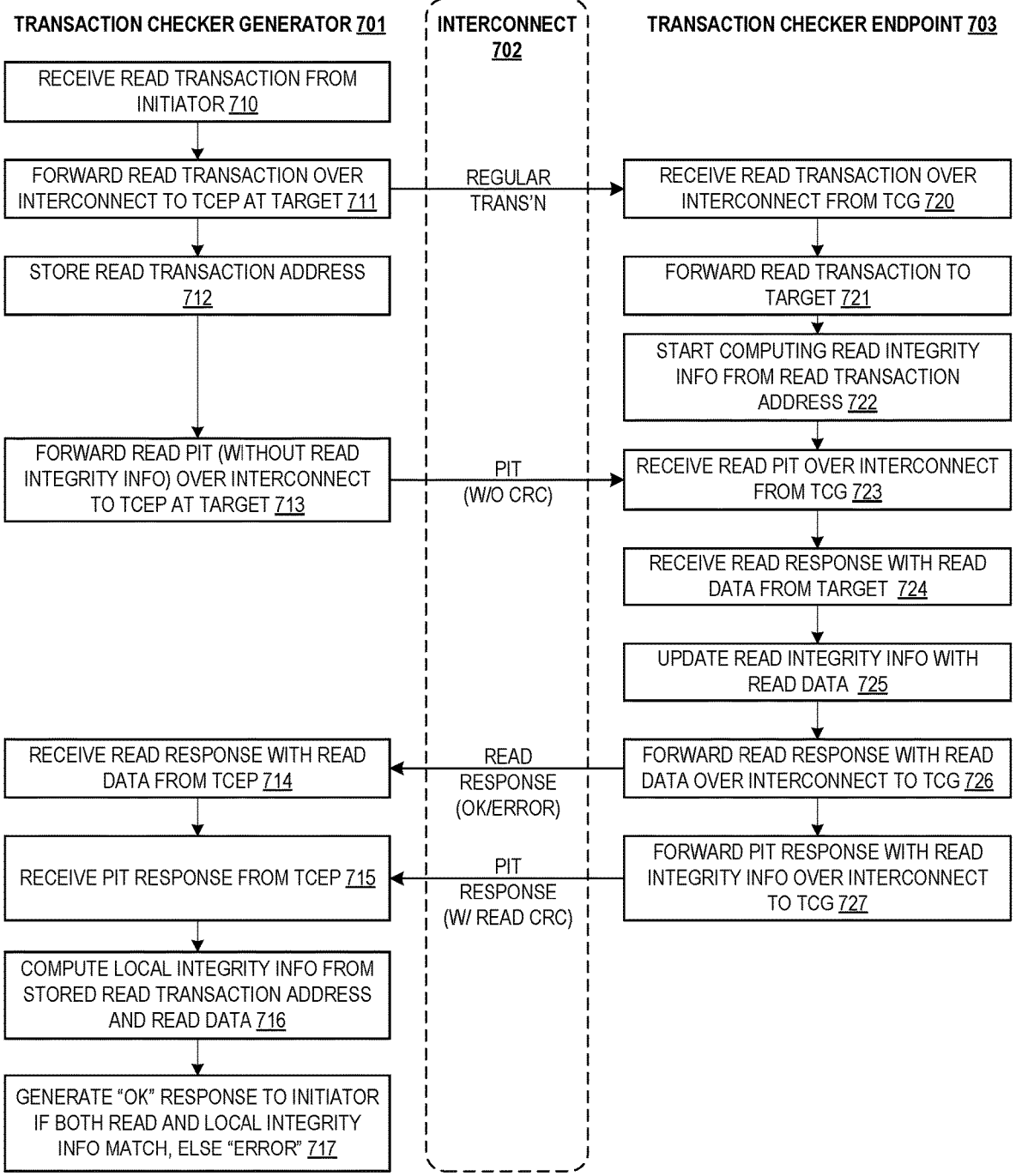
FIG. 7 is a simplified flow chart showing a sequence of steps performed by a transaction checker generator and transaction checker endpoint when handling read transactions in a synchronous integrity mode in accordance with selected embodiments of the present disclosure.

For an improved understanding of selected embodiments of the present disclosure, reference is now made to FIG. 7 which depicts a simplified flow chart 700 showing a communication sequence of steps performed by a transaction checker generator 701 and transaction checker endpoint 703 when handling read transactions over an interconnect 702 in a synchronous integrity mode to provide end-to-end transaction integrity over the interconnect 702. As discussed above, the transaction checker generator 701 may be part of an SoC system in which an initiator subsystem (not shown), such as a Cortex-M4 subsystem, generates one or more read transactions that are transmitted over the interconnect 702. In addition, the transaction checker endpoint 703 may also be part of the SoC system as part of a destination or target subsystem (not shown), such as a DRAM memory controller subsystem, which is connected to receive and process the read transaction(s). In such embodiments, the interconnect 702 may be embodied as a standard interconnect, such as, for example, an Intel® Quick Path Interconnect (QM) interconnect, though any suitable interconnect bus 702 may be used, such as a crossbar switch fabric, for example) that allows the initiator subsystem to access any destination or target subsystem, and that conversely allows data and/or response messages to be returned from any destination or target subsystem to any initiator subsystem.

At step 710, the transaction checker generator (TCG) 701 receives a read transaction from the initiator subsystem (not shown). In selected embodiments, the read transaction includes a transaction ID and a read address for memory location for reading or retrieving data at a destination or target subsystem, such as DRAM memory on the SoC system.

At step 711, the TCG 701 forwards the read transaction over the interconnect 702 to the transaction checker endpoint (TCEP) 703. In selected embodiments, the TCG 701 formats the read transaction as a regular read transaction which includes a destination address for the destination or target subsystem, a transaction ID, and one or more user bit fields which are set to a first value (e.g., 0b1) to identify the read transaction as a regular read transaction.

At step 720, the TCEP 703 receives the read transaction over the interconnect 702 from the TCG 701. In embodiments where the interconnect 702 is a standard interconnect (e.g., one that does not include integrity-protecting logic or circuitry), the regular read transaction that is received at the TCEP 703 may include a data error or fault that arose during transmission over the interconnect 702. However, at this point in the communication sequence, any such error is not detected, and the TCEP 703 forwards the read transaction to the destination or target subsystem as a non-modifiable transaction (step 721).

In order to detect potential data errors in the regular read transaction that arose during transmission over the interconnect 702, the TCG 701 initiates an error detection sequence at step 712 by storing the read transaction address at the TCG 701 which will be used subsequently to compute a local read integrity information once the read data is retrieved from the destination or target subsystem. In addition, the TCG 701 generates and forwards a read protecting information transaction (PIT) message at step 713 over the interconnect 702 to the TCEP 703. As generated, the read PIT message sent by the TCG 701 does not include any read integrity information, but may be formatted to include the same read transaction address and transaction ID as the regular read transaction, and to also include the one or more user bit fields which are set to a second value (e.g., 0b0) to identify the message as a PIT message.

In similar fashion, the TCEP 703 initiates an error detection sequence at step 722 by starting the computation of read integrity information from the read transaction address. In selected embodiments, the read integrity information may be computed by computing CRC values from the read destination address and transaction ID using the CRC-32 checksum algorithm from ITU-T V.42 protocol, but at this point, the read integrity information is not complete since read data has not been incorporated into the CRC computation.

At step 723, the TCEP 703 receives the read PIT message (which does not include the read integrity information) over the interconnect 702 from the TCG 701.

At step 724, the TCEP 703 receives a read response message from the destination or target subsystem (not shown) that was generated in response to the read transaction that was forwarded at step 721. As will be appreciated, the read response message from the destination/target subsystem will contain the read data that was requested by the initiator subsystem. In addition, the read response message can be received before or after the read PIT message is received from the TCG 701 at step 723.

At step 725, the TCEP 703 updates the read integrity information using the read data returned from the destination/target subsystem. In selected embodiments, the read integrity information may be updated by computing CRC values from the read destination address, transaction ID, and read data using the CRC-32 checksum algorithm from ITU-T V.42 protocol.

At step 726, the TCEP 703 forwards the read response message over the interconnect 702 to the TCG 701. If the read response message from the destination/target subsystem indicates there was no error during the read operation, and the TCEP 703 generates the read response message to include a read "OK" indication. However, if the read response message from the destination/target subsystem indicates there was an error during the read operation, and the TCEP 703 generates the read response message to include a read "ERROR" indication.

At step 727, the TCEP 703 generates and forwards a PIT response message over the interconnect 702 to the TCG 701. As indicated above, the PIT response message includes the read integrity information which may be computed as a CRC value from the read destination address, transaction ID, and read data. As will be appreciated, the read response message can be sent before or after sending the PIT response message.

At step 714, the TCG 701 receives the read response message from the TCEP 703 which includes the read data provided by the destination/target subsystem. And at step 715, the TCG 701 receives the PIT response message from the TCEP 703 which includes the read integrity information computed by the TCEP 703.

At step 716, the TCG 701 computes local integrity information from the stored read transaction address and the received read data. In selected embodiments, the local integrity information may be computed by computing CRC values from the read transaction address, transaction ID, and read data (returned in the read response message) using the CRC-32 checksum algorithm from ITU-T V.42 protocol.

At step 724, the TCG 701 compares the read integrity information (computed by the TCEP 703) to the local read integrity information (computed by the TCG 701) to see if there is a match. If both the read integrity information (computed by the TCEP 703) and the local read integrity information (computed by the TCG 701) match one another, the TCG 701 generates an "OK" response message to the initiator subsystem. However, if there is not a match between the read integrity information (computed by the TCEP 703) and the local read integrity information (computed by the TCG 701), then the TCG 701 generates and sends an "ERROR" response message to the initiator subsystem.

Figure 8:
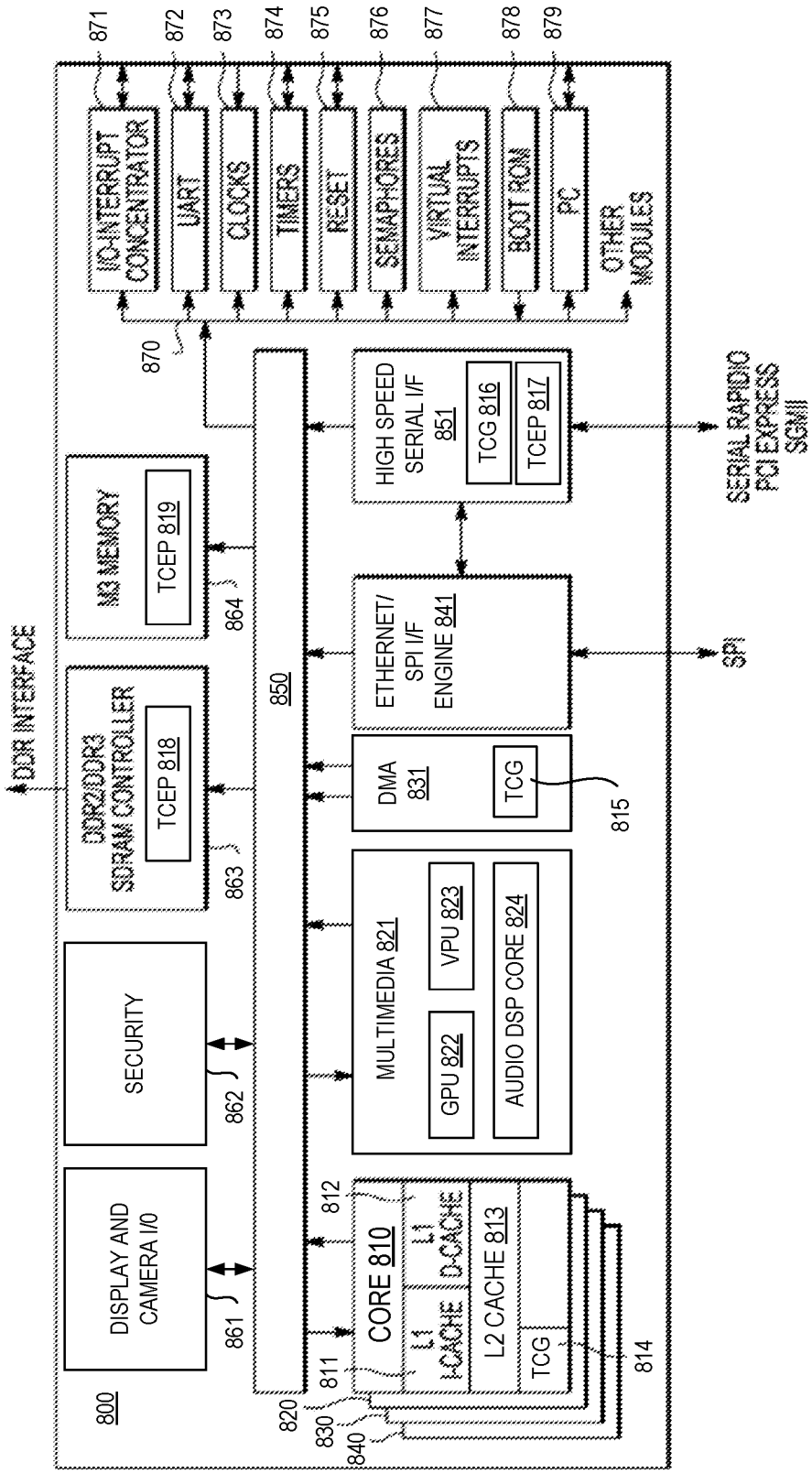
FIG. 8 is a simplified schematic diagram of a SOC chip having multiple SOC subsystems which include a transaction checker generator and/or transaction checker endpoint for providing end-to-end integrity protection over a standard interconnect in accordance with selected embodiments of the present disclosure.

Referring now to FIG. 8, there is shown a simplified schematic diagram of a multi-core system on chip (SoC) 800 having multiple SOC subsystems which are connected to communicate over an interconnect bus 850 by using transaction checker generator units (e.g., 814-816) and transaction checker endpoint units (e.g., 817-819) to provide end-to-end integrity protection over the interconnect bus 850 in accordance with selected embodiments of the present disclosure. As depicted, the SoC subsystems include one or more processor cores 810, 820, 830, 840, each of which may be configured to initiate a transaction request that is sent over the interconnect bus 850 to one of the other SoC subsystems, such as a multi-media accelerator unit 821, a direct memory access (DMA) engine 831, an ethernet/SPI interface engine 841, a high speed serial interface 851, display and camera I/O unit 861, a security module 862, a DRAM controller 863, on-chip M3 memory 864, and/or other hardware devices or modules 871-879.

Each of the processor cores 810, 820, 830, 840 may be configured to execute instructions and to process data according to a particular instruction set architecture (ISA), such as x86, PowerPC, SPARC, MIPS, and ARM, for example. In a selected embodiment, a highly suitable example of a processor design for the processor core is a Cortex-M4 processor core. However, persons having ordinary skill in the art will understand the processor cores 810, 820, 830, 840 are not limited to any particular manufacturer's microprocessor design. The processor core may be found in many forms including, for example, any 32-bit or 64-bit microprocessor manufactured by Freescale, Motorola, Intel, AMD, Sun or IBM. However, any other suitable single or multiple microprocessors, microcontrollers, or microcomputers may be utilized. In the illustrated embodiment, each of the processor cores 810, 820, 830, 840 may be configured to operate independently of the others, such that all cores may execute in parallel. In some embodiments, each of cores may be configured to execute multiple threads concurrently, where a given thread may include a set of instructions that may execute independently of instructions from another thread. Such a core may also be referred to as a multithreaded (MT) core. Thus, a single multi-core SoC 800 with four cores will be capable of executing a multiple of four threads in this configuration. However, it should be appreciated that the invention is not limited to four processor cores and that more or fewer cores can be included. In addition, the term "core" refers to any combination of hardware, software, and firmware typically configured to provide a processing functionality with respect to information obtained from or provided to associated circuitry and/or modules (e.g., one or more peripherals, as described below). Such cores include, for example, digital signal processors (DSPs), central processing units (CPUs), microprocessors, and the like. These cores are often also referred to as masters, in that they often act as a bus master with respect to any associated peripherals. Furthermore, the term multi-core (or multi-master) refers to any combination of hardware, software, and firmware that that includes two or more such cores (e.g., cores 810 and 820), regardless of whether the individual cores are fabricated monolithically (i.e., on the same chip) or separately. Thus, a second core may be the same physical core as first core, but has multiple modes of operation (i.e., a core may be virtualized).

As depicted, each processor core (e.g., 810) may include a first level (L1) cache which includes an instruction cache (icache) 811 and a data cache (dcache) 812. In addition, a second level of cache memory (L2) 813 may also be provided at each core, though the L2 cache memory can also be an external L2 cache memory which is shared by one or more processor cores. The processor core 810 executes instructions and processes data under control of the operating system (OS) which may designate or select the processor core 810 as the control or master node for controlling the workload distribution amongst the processor cores 810, 820, 830, 840. Communication between the cores 810, 820, 830, 840 may be over the interconnect bus 850 or over a crossbar switch and appropriate dual point to point links according to, for example, a split-transaction bus protocol such as the HyperTransport (HT) protocol (not shown).

While the processor cores 810, 820, 830, 840 may be identically designed or homogenous, different process core designs may be used. In addition or in the alternative, the multi-core SoC 800 may include one or more additional cores having a different design. For example, the depicted multi-core SoC 800 also includes one or more multi-media accelerator units 821 which include one or more graphics processor units (GPU) 822, vector processor units (VPU) 823, and/or audio digital signal processor cores 824. Each processor core is coupled across the interconnect bus 850 to communicate with the SoC subsystems 821, 831, 841, 851, 861-864, 871-879.

Each of the processor cores 810, 820, 830, 840 is in communication over the interconnect bus 850 with the SoC subsystems 821, 831, 841, 851, 861-864, 871-879. The interconnect bus 850 may be configured to concurrently accommodate a large number of independent accesses that are processed on each clock cycle, and enables communication data requests from the processor cores 810, 820, 830, 840 to the SoC subsystems 821, 831, 841, 851, 861-864, 871-879, as well as data responses therefrom. In selected embodiments, the interconnect bus 850 may include logic (such as multiplexers or a switch fabric, for example) that allows any core to access any bank of memory with a read or write transaction, and that conversely allows data to be returned from any memory bank to any core. The interconnect bus 850 may also include logic to queue data requests and/or responses, such that requests and responses may not block other activity while waiting for service. Additionally, the interconnect bus 850 may be configured as a chip-level arbitration and switching system (CLASS) to arbitrate conflicts that may occur when multiple cores attempt to access a memory or vice versa.

For example, the interconnect bus 850 is in communication with main memory controller 863 to provide access to the M3 memory 864 or main memory (not shown). Memory controller 863 may be configured to manage the transfer of data between the multi-core SoC 800 and system memory, for example. In some embodiments, multiple instances of memory controller 863 may be implemented, with each instance configured to control a respective bank of system memory. Memory controller 863 may be configured to interface to any suitable type of system memory, such as Double Data Rate or Double Data Rate 2 or Double Data Rate 3 Synchronous Dynamic Random Access Memory (DDR/DDR2/DDR3 SDRAM), or Rambus DRAM (RDRAM), for example. In some embodiments, memory controller 863 may be configured to support interfacing to multiple different types of system memory. In addition, the Direct Memory Access (DMA) controller 831 may be provided which controls the direct data transfers to and from system memory via memory controller 863.

As will be appreciated, the multi-core SoC 800 may be configured to receive data from sources other than system memory. To this end, a network interface engine 841 may be configured to provide a central interface for handling Ethernet and SPI interfaces, thus off-loading the tasks from the cores. In addition, a high speed serial interface 851 may be configured to support one or more serial RapidIO ports, a PCI-Express Controller, and/or a serial Gigabit Media Independent Interface (SGMII). In addition, one or more interfaces 870 may be provided which are configured to couple the cores to external boot and/or service devices, such as I/O interrupt concentrators 871, UART device(s) 872, clock(s) 873, timer(s) 874, reset 875, hardware semaphore(s) 876, virtual interrupt(s) 877, Boot ROM 878, I2C interface 879, GPIO ports, and/or other modules.

For any subsystem-to-subsystem communications over the interconnect bus 850 where the integrity of the code/data being exchanged should be protected against data transmission errors or faults, an initiating subsystem (e.g., processing core 810) includes a transaction checker generator (TCG) circuit (e.g., 814) which is configured to send regular transaction messages along with extra protecting information transaction (PIT) messages over the interconnect bus 850 for use in protecting the integrity of the regular transaction messages. Though not shown, each of the multi-media accelerator units 821 may have its own dedicated TCG circuit. In addition, other initiating subsystems, such as the DMA engine 831 or high-speed serial interface 851, may have its own dedicated TCG circuit 815, 816. At the receiving end of any subsystem-to-subsystem communications over the interconnect bus 850 where the integrity of the code/data being exchanged should be protected, any target or destination subsystem may include a transaction checker endpoint (TCEP) circuit which is connected and configured to receive the regular transaction messages and PIT messages and to evaluate the integrity of the regular transaction message based on the PIT messages. For example, the DRAM controller 863 includes a TCEP circuit 818, the M3 memory 864 includes a TCEP circuit 819, and the high-speed serial interface 861 includes a TCEP circuit 817.

By positioning a TCG circuit (e.g., 813) at each initiating SoC subsystem (e.g., processor core 810) along with one or more TCEP circuits (e.g., 817, 818, 819) at the target SoC subsystem(s) (e.g., 851, 863, 864), transactions from safety-related initiator SoC subsystems that are sent over a standard interconnect 850 can be protected by generating PIT and PTIR messages which are exchanged to achieve transaction integrity over the interconnect path. For each transaction issued by the initiator (a.k.a. regular transaction) which requires integrity protection, the TCG circuit (e.g., 814) generates a regular transaction that is transmitted over the interconnect bus 850, and also generates a PIT message that is transmitted along with the regular transaction over the interconnect bus 850. For write transactions, the TCG circuit computes protecting information that is included in the PIT message and sent over the interconnect bus 850 to the destination subsystem. For read transactions, the TCG circuit computes local protecting information based on the read address and transaction ID for the regular read transaction and based on the read data that is returned to the TCG circuit by the destination subsystem over the interconnect bus 850. The TCG circuit also handles the responses to the regular transaction and the PIT response (PITR).

At each destination SoC subsystem that can be reached by the protected transactions, a TCEP circuit (e.g., 818) is configured to process the regular transactions received over the interconnect bus 850, and to compute the response to the PIT transaction for transmission over the interconnect 850 to the initiator SoC subsystem. For example, the TCEP circuit (e.g., 818) that receives a regular write transaction may compute local protecting information (e.g., CRC data) based on received write address, transaction ID, and write data in the regular write transaction, and then compare the computed local protecting information to the protecting information received in the PIT message from the TCG circuit. Alternatively, the TCEP circuit that receives a regular read transaction may compute protecting information (e.g., CRC data) based on the received read address, transaction ID, and received read data, and then send the protecting information back to the originating TCG circuit where it is compared to a locally computed protecting information.

By now, it should be appreciated that there has been provided herein a multi-processor system-on-chip (SoC) apparatus, method, and system for checking end-to-end integrity of communications over a network interconnect. In selected embodiments, the network interconnect may be a network-on-chip (NoC) bus. In selected embodiments, the network interconnect is a non-safety aware network-on-chip (NoC) bus which does not include built-in integrity protection structures. In other embodiments, the network interconnect may be a Compute Express Link (CXL) interconnect. As disclosed, the SoC apparatus includes an initiator SoC subsystem, such as a processor core subsystem, that is configured to send a regular transaction message over the network interconnect and to receive a regular transaction response message from the network interconnect, where the regular transaction message and regular transaction response message do not include integrity values. In addition, the SoC apparatus includes a target SoC subsystem, such as a memory controller subsystem, that is configured to receive the regular transaction message from the network interconnect and to send the regular transaction response message over the network interconnect to the initiator SoC subsystem. The SoC apparatus also includes a first integrity module connected between the initiator SoC subsystem and network interconnect, where the first integrity module is configured to compute a first integrity value based on the regular transaction message or the regular transaction response message and to send a protecting information transaction (PIT) message over the network interconnect to the target SoC subsystem. In selected embodiments, the regular transaction message and the PIT message each include a memory address field, a transaction ID field, and a user bit field having a first value for the regular transaction message or a second value for the PIT message. In addition, the SoC apparatus includes a second integrity module connected between the network interconnect and the target Soc subsystem, where the second integrity module is configured to compute a second integrity value based on the regular transaction message or the regular transaction response message and to send a PIT response message over the network interconnect to the initiator SoC subsystem. In selected embodiments, the first integrity value and second integrity value are each cyclic redundancy check (CRC) values computed from information contained in the memory address field and transaction ID field and from information contained in the regular transaction message or regular transaction response message. The SoC apparatus also includes a compatibility module configured to compare the first and second integrity values to verify the end-to-end integrity of the regular transaction message or the regular transaction response message sent over the network interconnect. In selected embodiments where the initiator SoC subsystem is configured to send a regular write transaction message over the network interconnect to the target SoC subsystem, the first integrity module is configured to send the first integrity value in the PIT message sent over the network interconnect to the target SoC subsystem; the second integrity module is configured to compute the second integrity value based on a write address, transaction ID, and write data from the regular write transaction message; and the compatibility module is included in the second integrity module and configured to compare the first and second integrity values to verify the end-to-end integrity of the regular write transaction message sent over the network interconnect. In other embodiments where the initiator SoC subsystem is configured to send a regular read transaction message over the network interconnect to the target SoC subsystem, the second integrity module is configured to send read data in a regular read transaction response message over the network interconnect to the initiator SoC subsystem and to include the second integrity value in the PIT response message sent over the network interconnect to the initiator SoC subsystem; the first integrity module is configured to compute the first integrity value based on a read address, transaction ID, and read data from the regular read transaction response message; and the compatibility module is included in the first integrity module and configured to compare the first and second integrity values to verify the end-to-end integrity of the regular read transaction message sent over the network interconnect.

In another form, there is provided a multi-processor system-on-chip (SoC) apparatus, method, and system for end-to-end integrity protection of communications over a network interconnect, such as a network-on-chip (NoC) bus. In the disclosed method, a first integrity module receives a regular write transaction message generated by an initiator SoC subsystem (e.g., a processor core subsystem), where the regular write transaction message includes a write address and data for a target SoC subsystem (e.g., a memory controller subsystem) and does do not include integrity values. In addition, the first integrity module forwards the regular write transaction message over the SoC network interconnect to a second integrity module which is connected between the network interconnect and the target Soc subsystem, where the second integrity module forwards the regular write transaction message for write processing by the target SoC subsystem to return a write response message to the second integrity module. At the first integrity module, a first integrity value is computed based on the write address and data received by the first integrity module in the regular write transaction message. In addition, the first integrity module generates a write protecting information transaction (PIT) message which includes the first integrity value, and then send the write PIT message over the SoC network interconnect to the second integrity module. In selected embodiments, the regular write transaction message and the write PIT message each include a memory address field, a write data field, a transaction ID field, and a user bit field having a first value for the regular write transaction message or a second value for the write PIT message. At the second integrity module, a second integrity value is computed based on the write address and data included in the regular write transaction message received over the network interconnect. In selected embodiments, the first integrity value and second integrity value are each cyclic redundancy check (CRC) values computed from information contained in the memory address field, write data field, and transaction ID field. In addition, the second integrity module compares the first integrity value to the second integrity value to detect if there is a match between the first and second integrity values. If there is a match between the first and second integrity values, the second integrity module generates a PIT response message having a first value indicating there is end-to-end integrity of communications over the SoC network interconnect. And if there is not a match between the first and second integrity values, the second integrity module generates a PIT response message having second value indicating there is not end-to-end integrity of communications over the SoC network interconnect. Subsequently, the second integrity module forwards the write response message over the SoC network interconnect to first integrity module, and also sends the PIT response message over the SoC network interconnect to the first integrity module. At the first integrity module, a regular write transaction response message is generated that is sent to the initiator SoC subsystem. In selected embodiments, the regular write transaction response message is generated in response to at least the PIT response message and the write response message. In other embodiments, the regular write transaction response message is generated prior to receiving the PIT response message from the second integrity module, and the first integrity module subsequently generates an interrupt message that is sent to the initiator SoC subsystem in response to the PIT response message having the second value.

In yet another form, there is provided a multi-processor system-on-chip (SoC) apparatus, method, and system for end-to-end integrity protection of communications over a network interconnect, such as a network-on-chip (NoC) bus. In the disclosed method, a first integrity module receives a regular read transaction message generated by an initiator SoC subsystem, where the regular read transaction message includes a read address for a target SoC subsystem, but does not include integrity values. In response, the first integrity module forwards the regular read transaction message over the SoC network interconnect to a second integrity module which is connected between the network interconnect and the target Soc subsystem, where the second integrity module forwards the regular read transaction message for read processing by the target SoC subsystem to return a read response message comprising read data to the second integrity module. At the first integrity module, the read address from the regular read transaction message is stored. In addition, the first integrity module generates and sends a read protecting information transaction (PIT) message over the SoC network interconnect to the second integrity module. In selected embodiments, the regular read transaction message and the read PIT message each include a memory address field, a transaction ID field, and a user bit field having a first value for the regular read transaction message or a second value for the read PIT message. At the second integrity module, a first integrity value is computed based on the read address and read data included in the read response message received from the target SoC subsystem. In selected embodiments, the first integrity value is computed as a first cyclic redundancy check (CRC) value from information contained in the memory address field and transaction ID field of the regular read transaction message and from read data included in the read response message received from the target SoC subsystem. In addition, the second integrity module generates a PIT response message which includes the first integrity value, and then sends the PIT response message (and first integrity value) over the SoC network interconnect to the first integrity module. The second integrity module also forwards the read response message over the SoC network interconnect to first integrity module. Based on the read address stored at the first integrity module and the read data in the read response message received by the first integrity module, the first integrity module computes a second integrity value. In selected embodiments, the second integrity value is computed as a second cyclic redundancy check (CRC) value from information contained in the memory address field and transaction ID field of the regular read transaction message and from read data included in the PIT response message received from the second integrity module. The first integrity module also compares the first integrity value to the second integrity value to detect if there is a match between the first and second integrity values. If there is a match between the first and second integrity values, the first integrity module generates a regular read transaction response message having a first value indicating there is end-to-end integrity of communications over the SoC network interconnect. But if there is not a match between the first and second integrity values, the first integrity module generates a regular read transaction response message having a second value indicating there is not end-to-end integrity of communications over the SoC network interconnect. In selected embodiments, the regular read transaction response message is generated in response to at least the PIT response message and the read response message received at the first integrity module. In other embodiments, the regular read transaction response message is generated prior to receiving the PIT response message from the second integrity module, and the first integrity module subsequently generates an interrupt message that is sent to the initiator SoC subsystem in response to the PIT response message having the second value.

Some of the above embodiments, as applicable, may be implemented using a variety of differ rent information processing systems. For example, although FIG. 1 and the discussion thereof describe an exemplary SoC architecture in which different SoC subsystems include transaction checker generator or transaction checker endpoints circuits to provide end-to-end integrity protection over the interconnect subsystem, this exemplary architecture is presented merely to provide a useful reference in discussing various aspects of the invention. Description of the architecture has been simplified for purposes of discussion, and it is just one of many different types of appropriate architectures that may be used in accordance with the present disclosure. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

In addition, the example SoC system embodiments illustrated in FIGS. 1 and 8 may be implemented with circuitry located on a single integrated circuit or within a same device. Alternatively, the SoC system embodiments may include any number of separate integrated circuits or separate devices interconnected with each other. For example, the main memory 864 may be located in whole or in part on the same integrated circuit as the SoC control CPU 810 or on a separate integrated circuit or located within another peripheral or slave discretely separate from other elements of SoC system 800. Peripherals 871-879 may also be located in whole or in part on separate integrated circuits or devices. In yet other embodiments, the transaction integrity system disclosed herein may be used with systems which spread over several SoCs. For example, the Compute Express Link (CXL) is an interconnect specification used with CPU-to-Device and CPU-to-Memory designs which is not necessarily end to end it simply looks like a on chip NOC. In such a CXL interconnect, a first integrity module (TCG) may be connected on one end of the CXL interconnect and a second integrity module (TCEP) may be connected on the other end.

A system-on-chip (SoC) method and apparatus are disclosed for checking end-to-end integrity of communications over an network interconnect, where the SoC includes an initiator subsystem connected over the network interconnect to a target subsystem, wherein a first integrity module is configured to compute a first integrity value based on regular transaction messages sent or received by the initiator subsystem and to send a protecting information transaction (PIT) message over the network interconnect to the target subsystem, wherein a second integrity module is configured to compute a second integrity value based on regular transaction messages sent or received by the destination subsystem and to send a PIT response message over the network interconnect to the initiator subsystem, and wherein a compatibility module compares the first and second integrity values to verify the end-to-end integrity of the regular transaction messages sent or received over the network interconnect.

Furthermore, those skilled in the art will recognize that boundaries between the functionality of the above-described operations merely illustrative. The functionality of multiple operations may be combined into a single operation, or the functionality of a single operation may be distributed in additional operations. Moreover, alternative embodiments may include multiple instances of a particular operation, and the order of operations may be altered in various other embodiments.

All or some of the software described herein may be received from elements of the SoC system, such as, for example, from computer readable media such as memory 864 or other media on other computer systems. Such computer readable media may be permanently, removably or remotely coupled to an information processing system, such as the SoC system 800. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In selected embodiments, the SoC systems disclosed herein are part of a computer system such as an embedded microcontroller. Other embodiments may include different types of computer systems. Computer systems are information handling systems which can be designed to give independent computing power to one or more users. Computer systems may be found in many forms. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. The term "coupled," as used herein, is not intended to be limited to a direct coupling or a mechanical coupling. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. And unless stated otherwise, terms such as "first" and "second" are used to arbitrarily distinguish between the elements such terms describe. Thus, these terms are not necessarily intended to indicate temporal or other prioritization of such elements.

Although the described exemplary embodiments disclosed herein are directed to various embodiments, the present invention is not necessarily limited to the example embodiments which illustrate inventive aspects of the present invention that are applicable to a wide variety of SoC systems and operational methodologies. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

The invention claimed is:

1. A system-on-chip (SoC) apparatus to check end-to-end integrity of communications over a network interconnect, comprising:
an initiator SoC subsystem configured to send a regular transaction message over the network interconnect and to receive a regular transaction response message from the network interconnect, where the regular transaction message and regular transaction response message do not include integrity values;

a target SoC subsystem configured to receive the regular transaction message from the network interconnect and to send the regular transaction response message over the network interconnect to the initiator SoC subsystem;

a first integrity module connected between the initiator SoC subsystem and network interconnect, where the first integrity module is configured to compute a first integrity value based on the regular transaction message or the regular transaction response message and to send a protecting information transaction (PIT) message over the network interconnect to the target SoC subsystem;

a second integrity module connected between the network interconnect and the target Soc subsystem, where the second integrity module is configured to compute a second integrity value based on the regular transaction message or the regular transaction response message and to send a PIT response message over the network interconnect to the initiator SoC subsystem; and a compatibility module configured to compare the first and second integrity values to verify the end-to-end integrity of the regular transaction message or the regular transaction response message sent over the network interconnect, where the regular transaction message and the PIT message each comprise a memory address field, a transaction ID field, and a user bit field having a first value for the regular transaction message or a second value for the PIT message.

2. The SoC apparatus of claim 1, where the initiator SoC subsystem comprises a processor core subsystem.

3. The SoC apparatus of claim 1, where the target SoC subsystem comprises a memory controller subsystem.

4. The SoC apparatus of claim 1, where the network interconnect comprises a network-on-chip (NoC) bus.

5. The SoC apparatus of claim 1, where the first integrity value and second integrity value are each cyclic redundancy check (CRC) values computed from information contained in the memory address field and transaction ID field and from information contained in the regular transaction message or regular transaction response message.

6. The SoC apparatus of claim 1, where the initiator SoC subsystem is configured to send a regular write transaction message over the network interconnect to the target SoC subsystem, where the first integrity module is configured to send the first integrity value in the PIT message sent over the network interconnect to the target SoC subsystem, where the second integrity module is configured to compute the second integrity value based on a write address, transaction ID, and write data from the regular write transaction message, and where the compatibility module is included in the second integrity module and configured to compare the first and second integrity values to verify the end-to-end integrity of the regular write transaction message sent over the network interconnect.

7. The SoC apparatus of claim 1, where the initiator SoC subsystem is configured to send a regular read transaction message over the network interconnect to the target SoC subsystem, where the second integrity module is configured to send read data in a regular read transaction response message over the network interconnect to the initiator SoC subsystem and to include the second integrity value in the PIT response message sent over the network interconnect to the initiator SoC subsystem, where the first integrity module is configured to compute the first integrity value based on a read address, transaction ID, and read data from the regular read transaction response message, and where the compatibility module is included in the first integrity module and configured to compare the first and second integrity values to verify the end-to-end integrity of the regular read transaction message sent over the network interconnect.

8. A method for end-to-end integrity protection of communications over a system-on-chip (SoC) network interconnect, comprising:

receiving, at a first integrity module, a regular write transaction message generated by an initiator SoC subsystem and comprising a write address and data for a target SoC subsystem, where the regular write transaction message does not include integrity values;

forwarding, by the first integrity module, the regular write transaction message over the SoC network interconnect to a second integrity module which is connected between the SoC network interconnect and the target Soc subsystem and which forwards the regular write transaction message for write processing by the target SoC subsystem to return a write response message to the second integrity module;

computing, at the first integrity module, a first integrity value based on the write address and data received by the first integrity module in the regular write transaction message;

generating, at the first integrity module, a write protecting information transaction (PIT) message comprising the first integrity value;

sending, by the first integrity module, the write PIT message over the SoC network interconnect to the second integrity module;

computing, at the second integrity module, a second integrity value based on the write address and data included in the regular write transaction message received over the SoC network interconnect;

comparing, at the second integrity module, the first integrity value to the second integrity value to detect if there is a match between the first and second integrity values;

generating, at the second integrity module, a PIT response message having a first value indicating there is end-to-end integrity of communications over the SoC network interconnect if there is a match between the first and second integrity values, and having a second value indicating there is not end-to-end integrity of communications over the SoC network interconnect if there is not a match between the first and second integrity values;

forwarding, by the second integrity module, the write response message over the SoC network interconnect to first integrity module;

sending, by the second integrity module, the PIT response message over the SoC network interconnect to the first integrity module; and generating, at the first integrity module, a regular write transaction response message that is sent to the initiator SoC subsystem.

9. The method of claim 8, where generating the regular write transaction response message comprises generating the regular write transaction message in response to at least the PIT response message and the write response message.

10. The method of claim 8, where generating the regular write transaction response message comprises generating the regular write transaction message prior to receiving the PIT response message from the second integrity module, and further comprising generating, at the first integrity module, an interrupt message that is sent to the initiator SoC subsystem in response to the PIT response message having the second value.

11. The method of claim 8, where the regular write transaction message and the write PIT message each comprise a memory address field, a write data field, a transaction ID field, and a user bit field having a first value for the regular write transaction message or a second value for the write PIT message.

12. The method of claim 11, where the first integrity value and second integrity value are each cyclic redundancy check (CRC) values computed from information contained in the memory address field, write data field, and transaction ID field.

13. The method of claim 8, where the initiator SoC subsystem comprises a processor core subsystem, and where the target SoC subsystem comprises a memory controller subsystem.

14. A method for end-to-end integrity protection of communications over a system-on-chip (SoC) network interconnect, comprising:
   receiving, at a first integrity module, a regular read transaction message generated by an initiator SoC subsystem and comprising a read address for a target SoC subsystem, where the regular read transaction message does not include integrity values;
   forwarding, by the first integrity module, the regular read transaction message over the SoC network interconnect to a second integrity module which is connected between the SoC network interconnect and the target Soc subsystem and which forwards the regular read transaction message for read processing by the target SoC subsystem to return a read response message comprising read data to the second integrity module;
   storing, at the first integrity module, the read address from the regular read transaction message;
   generating, at the first integrity module, a read protecting information transaction (PIT) message;
   sending, by the first integrity module, the read PIT message over the SoC network interconnect to the second integrity module;
   computing, at the second integrity module, a first integrity value based on the read address and read data included in the read response message received from the target SoC subsystem;
   generating, at the second integrity module, a PIT response message comprising the first integrity value;
   sending, by the second integrity module, the PIT response message over the SoC network interconnect to the first integrity module;
   forwarding, by the second integrity module, the read response message over the SoC network interconnect to first integrity module;
   computing, at the first integrity module, a second integrity value based on the read address stored at the first integrity module and the read data in the read response message received by the first integrity module;
   comparing, at the first integrity module, the first integrity value to the second integrity value to detect if there is a match between the first and second integrity values; and
   generating, at the first integrity module, a regular read transaction response message having a first value indicating there is end-to-end integrity of communications over the SoC network interconnect if there is a match between the first and second integrity values, and having a second value indicating there is not end-to-end integrity of communications over the SoC network interconnect if there is not a match between the first and second integrity values.

15. The method of claim 14, where generating the regular read transaction message comprises generating the regular read transaction message in response to at least the PIT response message and the read response message received at the first integrity module.

16. The method of claim 14, where generating the regular read transaction message comprises generating the regular read transaction message prior to receiving the PIT response message from the second integrity module, and further comprising generating, at the first integrity module, an interrupt message that is sent to the initiator SoC subsystem in response to the PIT response message having the second value.

17. The method of claim 16, where the regular read transaction message and the read PIT message each comprise a memory address field, a transaction ID field, and a user bit field having a first value for the regular read transaction message or a second value for the read PIT message.

18. The method of claim 17, where the first integrity value comprises a first cyclic redundancy check (CRC) value computed from information contained in the memory address field and transaction ID field of the regular read transaction message and from read data included in the read response message received from the target SoC subsystem.

19. The method of claim 17, where the second integrity value comprises a second cyclic redundancy check (CRC) value computed, by the first integrity module, from information contained in the memory address field and transaction ID field of the regular read transaction message and from read data included in the PIT response message received from the second integrity module.

* * * * *